United States Patent
Benveniste et al.

(10) Patent No.: US 7,103,722 B2
(45) Date of Patent: Sep. 5, 2006

(54) CACHE CONFIGURATION FOR COMPRESSED MEMORY SYSTEMS

(75) Inventors: Caroline Benveniste, New York, NY (US); Peter Franaszek, Mt. Kisco, NY (US); John T. Robinson, Yorktown Heights, NY (US); Charles Schulz, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 10/200,937

(22) Filed: Jul. 22, 2002

(65) Prior Publication Data

US 2004/0015660 A1    Jan. 22, 2004

(51) Int. Cl.
    *G06F 12/00* (2006.01)
(52) U.S. Cl. .................. 711/134; 711/133; 711/136; 711/129; 711/118; 711/120; 711/142; 714/5; 714/42
(58) Field of Classification Search ................ 711/120, 711/133–134, 136, 128–129, 142–143, 159, 711/121, 130, 118; 714/5, 42
    See application file for complete search history.

(56) References Cited

U.S. PATENT DOCUMENTS

| | | | | |
|---|---|---|---|---|
| 5,347,648 | A * | 9/1994 | Stamm et al. | 714/5 |
| 5,469,555 | A * | 11/1995 | Ghosh et al. | 711/133 |
| 5,566,315 | A * | 10/1996 | Mililo et al. | 711/113 |
| 6,044,478 | A * | 3/2000 | Green | 714/42 |
| 6,438,655 | B1 * | 8/2002 | Nicol et al. | 711/136 |
| 2001/0049770 | A1 * | 12/2001 | Cai et al. | 711/129 |
| 2001/0049771 | A1 * | 12/2001 | Tischler et al. | 711/133 |
| 2002/0049889 | A1 * | 4/2002 | Hoogerbrugge et al. | 711/134 |

OTHER PUBLICATIONS

Derek Chiou et al, "Dynamic Cache Partitioning via Columnization", Proceedings of Design Automation Conference, Jun. 2000.*
Franaszek et al., On Management of Free Space in Compressed Memory Systems, 19990701, Performance-Evaluation-Review (USA), vol. 27, No. 1, p. 113-21.*
Chiou et al., Dynamic cache Partitioning via Columnization, Massachussets Institute of Technology Laboratory for Computer Science.*

* cited by examiner

*Primary Examiner*—Mardochee Chery
(74) *Attorney, Agent, or Firm*—Gibb I.P. Law Firm, LLC; Derek S. Jennings

(57) ABSTRACT

A method and structure is disclosed for constraining cache line replacement that processes a cache miss in a computer system. The invention contains a K-way set associative cache that selects lines in the cache for replacement. The invention constrains the selecting process so that only a predetermined subset of each set of cache lines is selected for replacement. The subset has at least a single cache line and the set size is at least two cache lines. The invention may further select between at least two cache lines based upon which of the cache lines was accessed least recently. A selective enablement of the constraining process is based on a free space memory condition of a memory associated with the cache memory. The invention may further constrain cache line replacement based upon whether the cache miss is from a non-local node in a nonuniform-memory-access system. The invention may also process cache writes so that a predetermined subset of each set is known to be in an unmodified state.

24 Claims, 5 Drawing Sheets

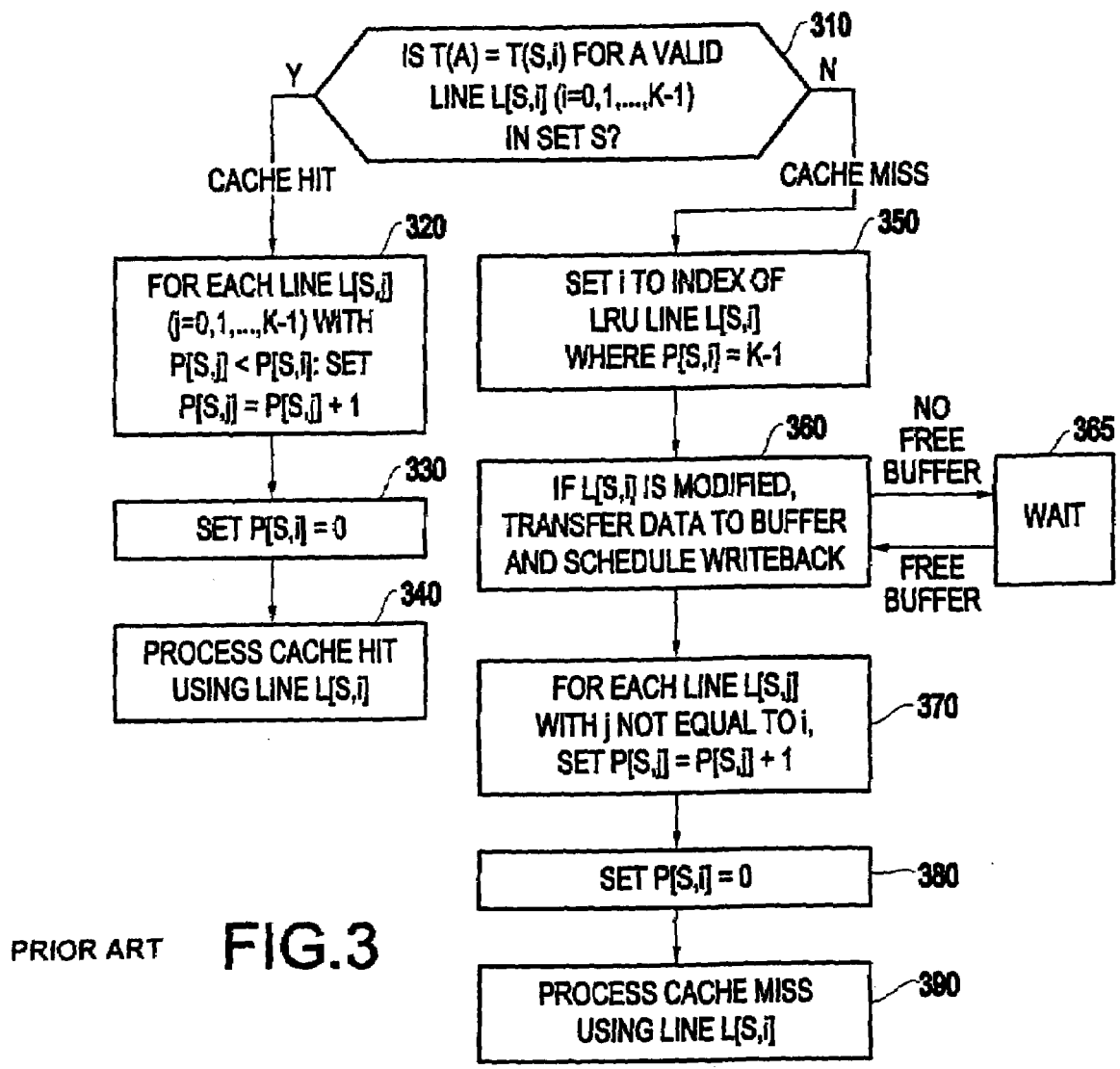
PRIOR ART FIG.3

CACHE CONFIGURATION FOR COMPRESSED MEMORY SYSTEMS

BACKGROUND OF THE INVENTION

1. Field of the Invention

The present invention generally relates to novel cache configurations for compressed memory systems.

2. Description of Related Art

A compressed memory system is a system in which main memory is divided into a number of logically fixed size segments (e.g., units of compression or lines). Each such logical segment is physically preferably stored in a compressed format. A segment is stored in an uncompressed format if it cannot be compressed. One way of implementing such systems is to make use of a cache between main memory and higher-level caches; to decompress lines on cache misses; and to compress lines on writebacks of modified cache lines. FIG. 1 illustrates a high-level system architecture for a compressed memory system of this type: processors, together with level 1 (L1) and level 2 (L2) caches (110, 120) share a large L3 cache (130) in which data is stored in uncompressed format. On a cache writeback, the data is compressed by a compressor (140) before being stored in main memory (160); conversely, on a cache miss, data is decompressed by a decompressor (150) as it is read from main memory (160).

An issue in such systems is that the compression of the data stored in the compressed memory system can vary dynamically. If the amount of free space available in the compressed memory becomes sufficiently low, there is a possibility that a writeback of a modified cache line could fail. To prevent this, interrupts may be generated when the amount of free space decreases below certain thresholds, with the interrupts causing OS (operating system) intervention so as to prevent this from occurring.

If the line size of the cache in a compressed memory system is smaller than the compressed memory line size (i.e., size of a unit of compression), the amount of free space in the compressed memory system required to guarantee that all modified cache lines can be written back could be unacceptably large. An example follows.

Suppose that the unit of compression is 1024 bytes, that the cache line size is 64 bytes, and that the cache holds M lines. The worst case loss of compression that could result from a store of a modified 64 byte line depends on details of the compressed memory system compression and storage allocation designs; an upper bound on the loss of compression is that a compressed memory line could become incompressible, and require 1024 bytes; thus in general it may be necessary to reserve 1024 bytes of free space in the compressed memory system for each modified 64 byte cache line. Furthermore, in general the number of modified cache lines may not be known, and the number of distinct compressed memory lines for which there is one or more cache lines residing in the cache also may not be known; in the worst case all cache lines may be modified and reside in distinct compressed memory lines. Since the ratio of cache line size to compressed memory line size is 16 (16×64=1024), this means that to handle this worst case an upper bound on the amount of free space that must be reserved in the compressed memory is 16×64×M=1024×M bytes. Such a requirement can significantly reduce the overall compression (that is the compression taking into account the free space together with compressed memory system storage fragmentation and directory overheads). It is, therefore, an object of this invention to reduce the amount of free space required to guarantee that all modified cache lines can be written to a compressed main memory system.

There are related problems associated with the design of NUMA (non-uniform-memory-access) architectures. In such systems, there are a number of nodes, where each node has processors, a cache hierarchy, and main memory. For convenience, only the cache immediately above main memory in each such node is considered. A global real memory space is provided in such architectures by means of addressing schemes in which any node may address the real memory of any other node by means of inter-cache transfers. FIG. 2 illustrates a high-level system architecture of this type. The figure is adapted from the book by Lenoski and Weber, Scalable Shared-Memory Multiprocessing, FIG. 3-2, "Nonuniform Memory Access (NUMA) Architecture", page 91, and in which further descriptions of NUMA architectures and references to the extensive prior art can be found. As shown in FIG. 2, in a typical NUMA system there are a number of nodes, where each node consists of a processor (210 in the first node, 220 in the second node, and 230 in the last node), a cache (240 in the first node, 250 in the second node, and 260 in the last node), and a memory local to that node (270 in the first node, 280 in the second node, and 290 in the last node). Inter-cache transfers, which enable access from one node to a non-local memory of a different node, take place by means of an interconnection network (295). If the local memories in such systems are implemented using compressed memory architectures, situations may arise in which the cache in a given node contains not only uncompressed sections of compressed memory lines from the given node, but uncompressed sections from compressed memory lines from any other node in the NUMA system. This significantly complicates the problem of guaranteeing forward progress, since in analogy with the above worst case analysis, an additional factor equal to the number of nodes in the NUMA system must be taken into account for required free space calculations. That is, if there are N nodes in the NUMA system, an upper bound on the amount of free space that must be reserved in the compressed memory is 16×64× M×N=1024×M×N bytes, that is N times more than the above example. Furthermore, OS handling of a compressed memory low free space condition on one node could cause writebacks of modified remote lines, which could cause a low free space condition on a remote node; that is a "chain reaction" in low free space conditions is possible. It is, therefore, desirable to de-couple low free space condition handling on each node, in a manner which complements the cache operation constraints for those cases in which the OS is handling a compressed memory low free space condition.

SUMMARY OF THE INVENTION

In a compressed memory system, the amount of free space required to guarantee forward progress during operating system handling of a low free space condition is reduced by cache configurations in which constraints are imposed on the cache lines, where such constraints relate to which cache lines can be selected for replacement in processing cache misses. Furthermore, with the invention in nonuniform memory access (NUMA) systems having a number of compressed memory systems, the amount of free space required to guarantee forward progress during operating system handling of low free space conditions is reduced, and potential chain reactions of low free space conditions are avoided, by means of cache configurations in which constraints are imposed on the cache lines that can be used to hold non-local data. Finally, by using cache configurations in which certain predetermined cache lines are always processed using store-through rather than store-in mechanisms, with the invention the amount of free space The invention easily processes a cache miss in a computer system that contains a K way set associative cache. The invention first selects lines in the cache for replacement, and then constrains the selecting process so that only a predetermined subset of each set of cache lines is selected for replacement. The subset has at least a single cache line and the set size (that is, K) is at least two cache lines. The invention may then further select between at least two cache lines based upon which of the cache lines was accessed least recently. The constraining of the selecting process is selectively enabled. A selective enablement of the constraining of the selecting process is based on a free space memory condition of a memory associated with the cache. The constraining of the selecting process only allows the subset to be replaced.

The invention can perform cache line replacement for processing a cache miss in a nonuniform memory access computer system that has a plurality of nodes. Each of the nodes contains a K way set associative cache and a local memory. The invention first selects lines in the cache for replacement and then constrains the selecting process so that a predetermined subset of a set of cache lines is reserved for data residing in a memory of a local node. The constraining of the selecting process prohibits data from the non local node from replacing data in a cache line within the subset. The constraining of the selecting process allows data from a local node to replace data in all lines in the subset.

The invention can perform cache line replacement for processing a cache miss in a nonuniform memory access computer system that has a plurality of nodes. Each of the nodes contains a K-way set associative cache and a local memory. The invention first selects lines in the cache for replacement and then constrains the selecting process so that a predetermined subset of a set of cache lines is reserved for data residing in a memory of a non-local node. The constraining process prohibits data from the non-local node from replacing data in a cache line within the subset. The constraining process allows data from a local node to replace data in all lines in the subset.

The invention can also process a cache write hit in a computer system that contains a K way set associative cache and a memory. The invention modifies a subset of a set of cache lines. The invention writes data from the subset to the as the subset is modified. The invention modifies the remaining cache lines of the set without writing to the memory.

The invention provides an alternative method of processing a cache write hit in a computer system that contains a K-way set associative cache and a memory. The invention modifies a subset of a set of cache lines. The invention then writes data from the subset to the memory immediately as the subset is modified. Next, the invention marks the subset as unmodified, so that the subset is always in an unmodified state. The invention modifies the remaining cache lines of the set without writing to the memory.

BRIEF DESCRIPTION OF THE DRAWINGS

The foregoing and other objects, aspects and advantages will be better understood from the following detailed description of a preferred embodiment(s) of the invention with reference to the drawings, in which:

FIG. 3 is a schematic diagram showing a control Flow for a K-Way Set Associative Cache using LRU Replacement;

Figure 1:
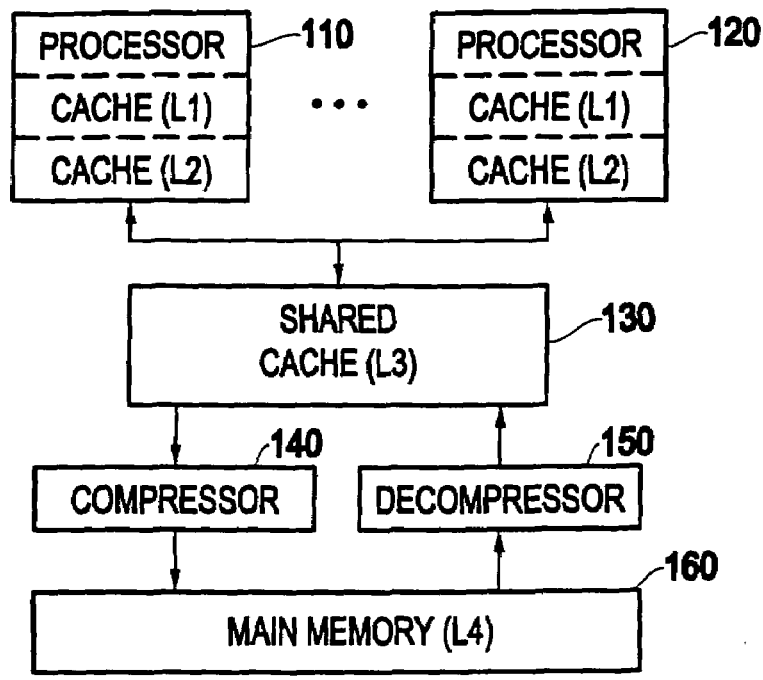
FIG. 1 is a schematic diagram showing a structure of a Computer System using Compressed Main Memory.
Figure 2:
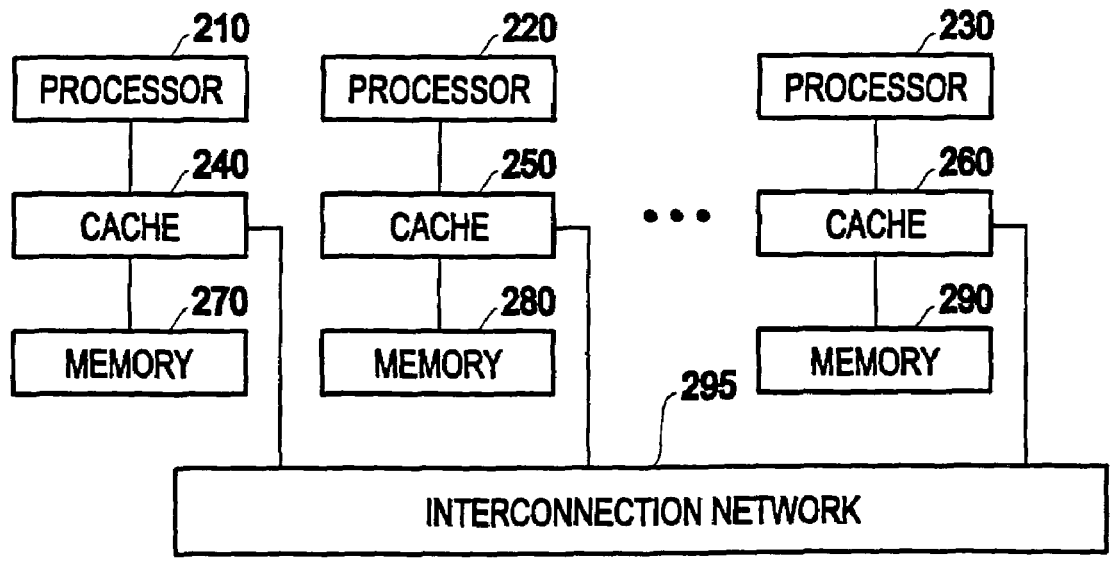
FIG. 2 is a schematic diagram showing a example of a Multi-Node NUMA System.

DETAILED DESCRIPTION OF PREFERRED
EMBODIMENTS OF THE INVENTION

Caches are typically designed using set-associativity, as follows: in a K-way set-associative cache with M lines, there are M/K sets, where each such set contains K lines, and each real memory address aligned on a cache line boundary maps to a uniquely determined set (for example see the book by Stone, High-Performance Computer Architecture 3rd. ed., page 38). Each real memory address A is uniquely identified (at cache line size granularity) by its set number $S(A)$ and its tag $T(A)$. Given a real memory address, its tag and set number are computed, and the presence of data at this address in the cache is found by mean of the cache directory. The cache directory also maintains, for each cache line, the status of that cache line (for example, clean, modified, or invalid, together with in some designs the LRU state of the line). All of this is known in the extensive art related to cache design for computer systems. For example, in addition to the previously mentioned book by Stone, see the book by Hennessy and Patterson, Computer Architecture A Quantitative Approach, 2nd ed., Chapter 5, Memory-Hierarchy Design, pages 372–483.

In a compressed memory low free space condition (e.g., where available free memory is less than a given number of megabytes, as set by the OS during system initialization, and where this number depends on the size of the cache as previously described), the OS, signaled by an interrupt, logically reduces the size of the real memory space. During this processing, as discussed above, it is necessary to guarantee that all modified cache lines can be written back if necessary (the OS routine handling the low free space condition can cause lines to be replaced in the cache, and any such modified line must be written back). The amount of compressed memory free space required to guarantee this can be reduced by constraining the use of the cache during this processing, as follows. For convenience assume K=4 (4-way set associativity); then each set S contains four lines, say L[S,0], L[S,1], L[S,2], L[S,3]. During constrained cache operation, a cache hit may be satisfied by any line in any set. However, a cache miss, which in general requires replacement of a line (and a writeback if the line is modified), is constrained so that only one of the lines (e.g., L[S,0] (where S is any set)) may be replaced to handle the miss. This reduces the upper bound on the amount of required free space by, in this example, a factor of four. This mechanism can be generalized for other values of K, and for a subset of lines in each set instead of the single line described above.

In the case of a NUMA system, the above mechanism can be extended as follows. As an example, again assume 4-way set associativity and that only the first line of each set (lines L[S,0], where S is any set) is being used to handle replacements during constrained cache operation. In this example, an additional constraint is imposed such that for each node of the NUMA system, lines from remote nodes are only allowed to be stored as lines L[S,1], L[S,2], or L[S,3] (where S is any set). With this constraint, lines L[S,0] can only contain data from the node's local main memory and, when used in conjunction with the constrained cache operation used during OS processing to handle a compressed memory low free space condition, the upper bound on the required free space becomes independent of the number of nodes in the system. As before, this mechanism can be generalized for other values of K, and for a subset of lines in each set instead of just one. Using these mechanisms, and with K=4, the upper bound on the required free space of 1024×M×N bytes given above is reduced to 1024×M/4=256×M bytes, for example.

Finally, a third type of constraint may be imposed such that, for example, the first line L[S,0] of each set is always guaranteed to be clean (that is, not modified). Combined with the above, the result is a cache configuration in which no writebacks of the initial cache contents are required during OS processing to handle a compressed memory low free space condition. This constraint operates as follows: on a cache write hit to a line L[S,0] in set S, instead of handling the write hit by writing to L[S,0], marking L[S,0] as modified in the cache directory, and completing the operation (that is processing the write in a store-in fashion, which is typical for high performance cache designs), this aspect of the invention handles the cache write hit by writing to L[S,0], transferring the data of line L[S,0] to a writeback buffer, and then marking L[S,0] as clean (i.e., non-modified) in the cache directory (i.e. handle cache write hits in this particular case in a store-through fashion). The result is that each line L[S,0] (in each set S) will always be in a "clean" (i.e., non-modified) state.

The above mechanisms will now be described in detail, and with reference to FIGS. 3, 4A, 4B, 5, and 6. For illustrative purposes, the cache replacement policy is chosen as LRU (least recently used). There are a variety of methods known for cache replacement policies in the prior art (other examples include "pseudo-LRU", "random replacement", etc.); LRU replacement is chosen here in order to show the methods in detail. However, it should be understood that it is straightforward to use the inventive methods shown with any other conventional replacement policy.

For comparison, a typical mechanism for handling a memory reference (read or write) from address A in a K-way set associative cache is shown in FIG. 3. The LRU state of each set is maintained in the cache directory as an encoding of a permutation P[S,0], P[S,1], . . . , P[S,K−1]. For example, suppose K=4, and that (P[S,0], P[S,1], P[S,2], P[S,3]) is (3, 1, 2, 0). This encodes a reference history in which line L[S,3] is the most recently referenced line (since "0" is the fourth entry), line L[S,1] is the next most recently referenced line (since "1" is the second entry), and so on (that is, following the ordering given by the positions of 0, 1, 2, 3). In practice, each of the permutations is encoded as a state in a hardware-implemented state machine, and the logical re-ordering of the LRU state shown in the various figures is in practice not implemented as a sequential process, but rather as a single state transition.

Referring to FIG. 3, in 310 it is determined by examining the cache directory if the tag for memory address A, T(A), compares equal to any of the tags stored in the cache directory for the set S=S(A) which is computed using memory address A. If so, the result is a cache hit, and in 320 and 330 the LRU state of the lines in set S is changed. Logically this entails a state change in which each line L[S,j] with P[S,j]<P[S,i] (that is, each more recently referenced line) has P[S,j] set to P[S,j]+1 (that is, setting the state for each such line to be one reference less recently referenced), as shown in 320, and by setting P[S,i] to 0, that is setting the state for line L[S,i] to be the most recently referenced as shown in 330. In 340 the cache hit is processed (which in practice may take place in parallel with the LRU state transition), that is for a read hit, data is read from line L[S,i] and for a write hit, data is written to line L[S,i].

Continuing with the example of a prior art LRU managed cache, if no tag compares equal in 310, then the result is a cache miss. In this case it is necessary to find a line in set S to replace in order to handle the miss. For LRU replacement, the line chosen is the least recently used line, that is the line with index i, L[S,i], in which logically the LRU state of the line is that P[S,i] is K−1, as shown in 350. If L[S,i] is modified, then before replacing the line it is necessary to write out the line, as shown in 360 and 370. In 360 it is determined if the line is modified, and if so, the data of line L[S,i] is transferred to a writeback buffer, waiting if necessary in 365 if there is currently no free writeback buffer. Next, in 370 and 380, the logical change in the LRU state of the lines in set S is shown. For each line L[S,j] other than L[S,i], P[S,j] is logically set to P[S,j]+1 (that is, the state for each such line is logically set to be one reference less recently referenced), as shown in 370. The line selected for replacement, L[S,i], becomes the most recently used line by logically setting P[S,i] to 0, as shown in 380. Last, in 390, the cache miss is processed using the line selected for replacement, L[S,i]. As before, in practice the change in the LRU state of the lines in set S may take place in parallel with cache miss processing 390.

Figure 4B:
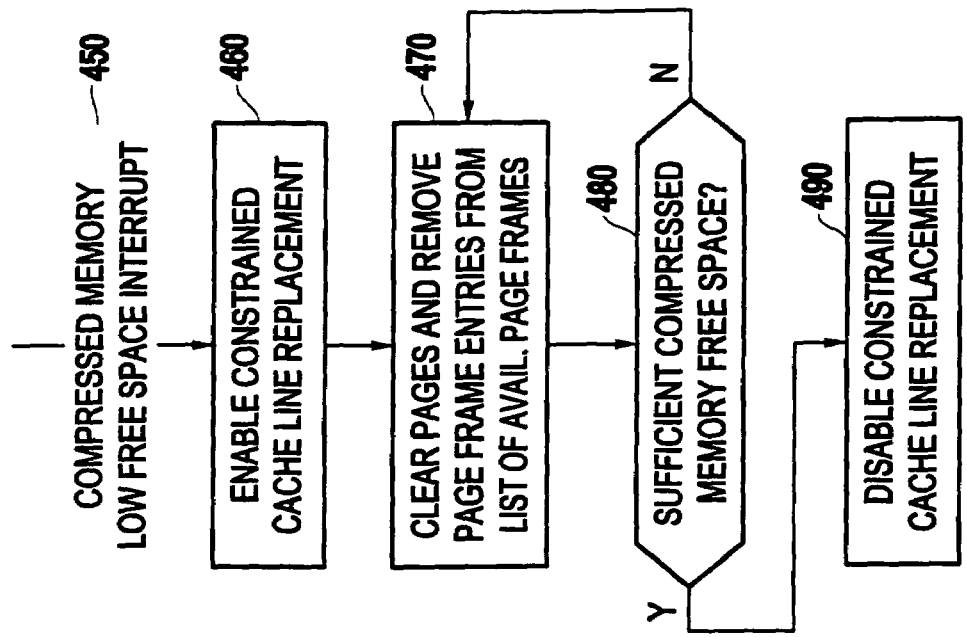
FIG. 4B is a schematic diagram showing a operating Systems Enables/Disables Constrained Cache Line Replacement.
Figure 4A:
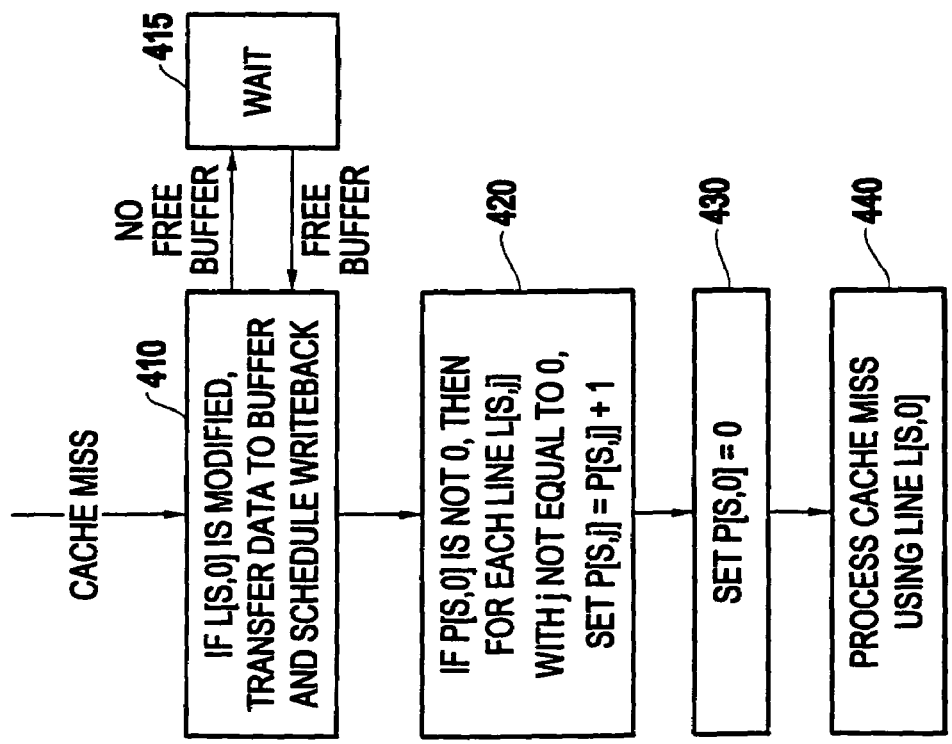
FIG. 4A is a schematic diagram showing a control Flow for a K-Way Set Associative Cache using Constrained Replacement for a Cache Miss.

According to a first embodiment of the invention, the cache miss control flow as has been illustrated in FIG. 3 (e.g., 350–390), is changed as shown in FIG. 4A. This shows in more detail the change in the cache replacement policy which is used by the invention during the handling of a low free space memory condition by the OS in a compressed memory system, as has been described above. Instead of selecting the LRU line for replacement, the "first" line in the set S, that is the line with index 0, namely L[S,0], is always chosen for replacement, without respect to the current LRU state of the lines in the set. Since now L[S,0] is always chosen for replacement, it is necessary to first write out L[S,0] if it is in a modified state, as shown in 410. In this case the data of line L[S,0] is transferred to a writeback buffer (waiting in 415 if there is no free buffer). Next, the LRU state of the lines in set S is updated. As shown in 420, for each line L[S,j] with j not equal to 0 (that is j=1,2, . . . , K−1) and where L[S,j] is a more recently referenced line than L[S,0], that is the LRU state of the set is one which corresponds to P[S,j]<P[S,0], logically P[S,j] is set to P[S,j]+1 (that is the line becomes one reference less recently referenced). Next, as shown in 430, logically P[S,0] is set to 0 (that is line L[S,0] becomes the most recently referenced line). Finally, the cache miss is processed using line L[S,0] in 440. As before, in practice the change in the LRU state of the lines in set S may take place in parallel with cache miss processing 440.

Note that it is straightforward to generalize this so that rather than always using L[S,0] for replacement, the cache operation could be constrained so that only a predetermined subset of lines in each set S are available for replacement. For example, only the "first two" lines, L[S,0] and L[S,1], could be used for replacement. In this case, either L[S,0] or L[S,1] could be selected for replacement depending on which of the two lines was least recently used, for example (other replacement policies, for example "random" replacement, could also be used).

The constrained replacement cache miss processing as illustrated in FIG. 4 is enabled by the OS prior to handling a compressed memory low free space condition, and disabled at the end of such processing. An example of this is illustrated in FIG. 4B. In response to a compressed memory low free space condition (450), the OS enables constrained cache line replacement in 460. The handling of the compressed memory low free space condition can take place in various ways as described in previously cited references; one such general method is to clear selected pages and remove the page frame entries from the list of available page frames (470) until the compressed memory free space exceeds a threshold (480). Finally, having completed handling the low free space condition, in 490 the OS disables constrained cache line replacement.

Figure 5:
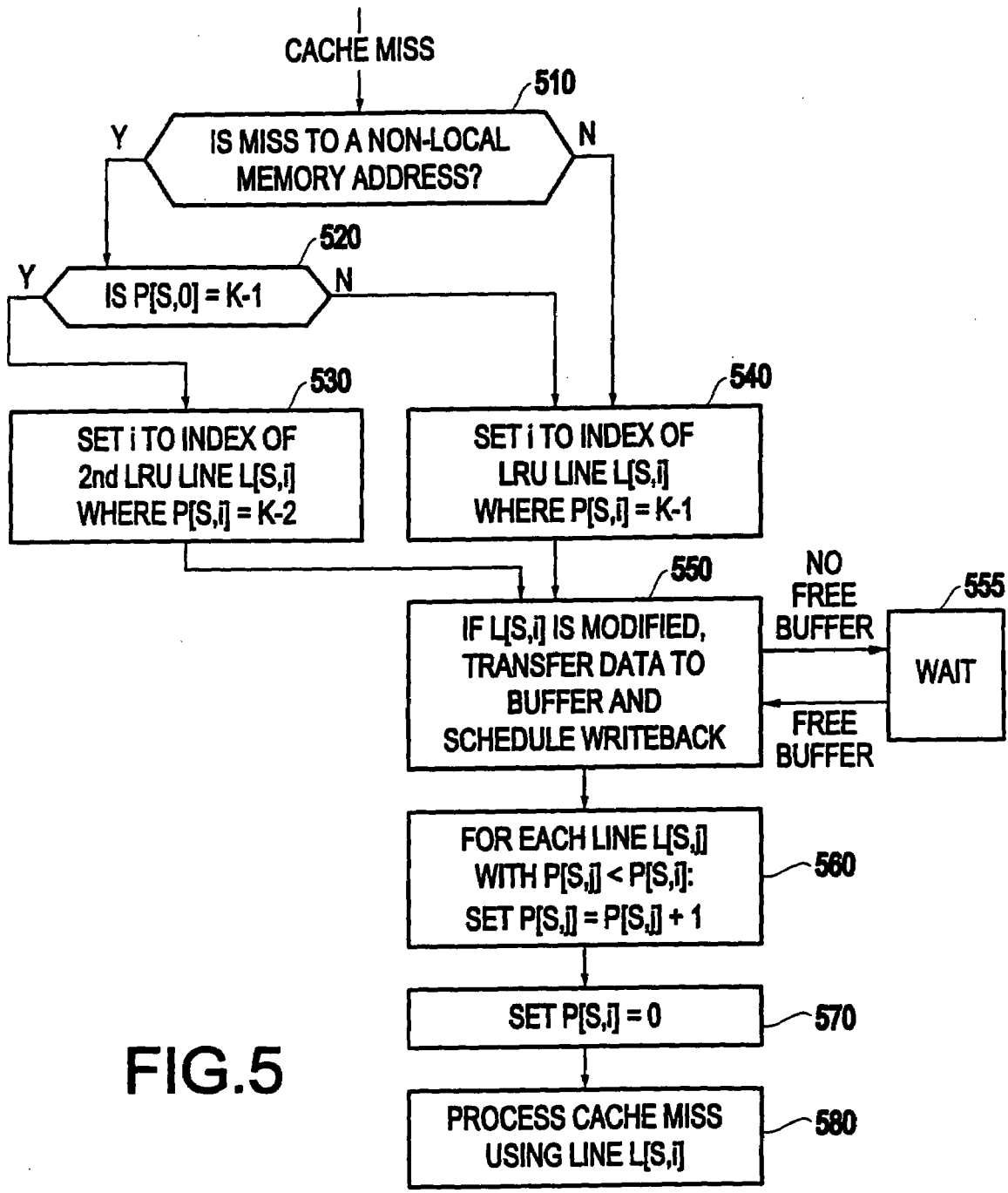
FIG. 5 is a schematic diagram showing a control Flow for a K-Way Set Associative Cache with Constrained LRU Replacement for Remote Cache Lines.

According to another embodiment of the invention, in a NUMA system, constraints are imposed so that certain lines in each set are known to contain only data from each node's local main memory. A more detailed example of this is illustrated in FIG. 5. In the case of a cache miss, as shown in 510, it is first checked whether the miss is to a non-local memory address (that is, an address corresponding to a location in the memory of a remote node). If so, control proceeds to 520, in which it is checked if line L[S,0] is the LRU line, that is, whether logically P[S,0] is K−1. If so, rather than selecting L[S,0] for replacement (as is done conventionally), instead the second most least recently referenced line is selected. Logically, this is the line L[S,j] in which P[S,i] is K−2, as shown in 530. If in 510 it was determined that the miss was to a local memory address, or if in 520 it was determined that L[S,0] was not the LRU line, then control proceeds to 540, in which the LRU line L[S,i] is found (that is the line in which logically P[S,i] is K−1). Note that in this case, due to the checks in 510 and 520, it is known that either this is a miss to a local memory address, or that this is a miss to a remote address but that i is not equal to 0. In both cases (530 and 540), control then proceeds to 550.

The logical steps shown in 550, 555, 560, 570, and 580 correspond to the handling of a cache miss is similar to the steps previously shown in FIG. 3 as 360, 365, 370, 380, and 390 respectively, and as have already been described. That is, starting with logical step 550, the cache miss is handled. However unlike conventional systems, the line selected for replacement has been constrained so that each line L[S,0], for every set S, is known to contain only local data, that is, data from the node's local memory. Thus, this aspect of the invention allows the local memory to use any of the lines in a given set and insures that a certain portion (e.g., L[S,0]) of the set is devoted to local memory.

According to an additional embodiment of the invention, the cache is configured so that for each set S, line L[S,0] is known to be in a clean (that is non-modified) state. With this aspect of the invention, a selected portion of the set is immediately written through to the main memory. The remaining portion of the set (e.g., L[S,1–3]) is treated normally and is simply shown as being modified in the cache. In this manner, by immediately writing the data through to a buffer or main memory, for a selected portion of the cache, that portion of the cache will always be in an unmodified state (e.g., "clean").

Figure 6:
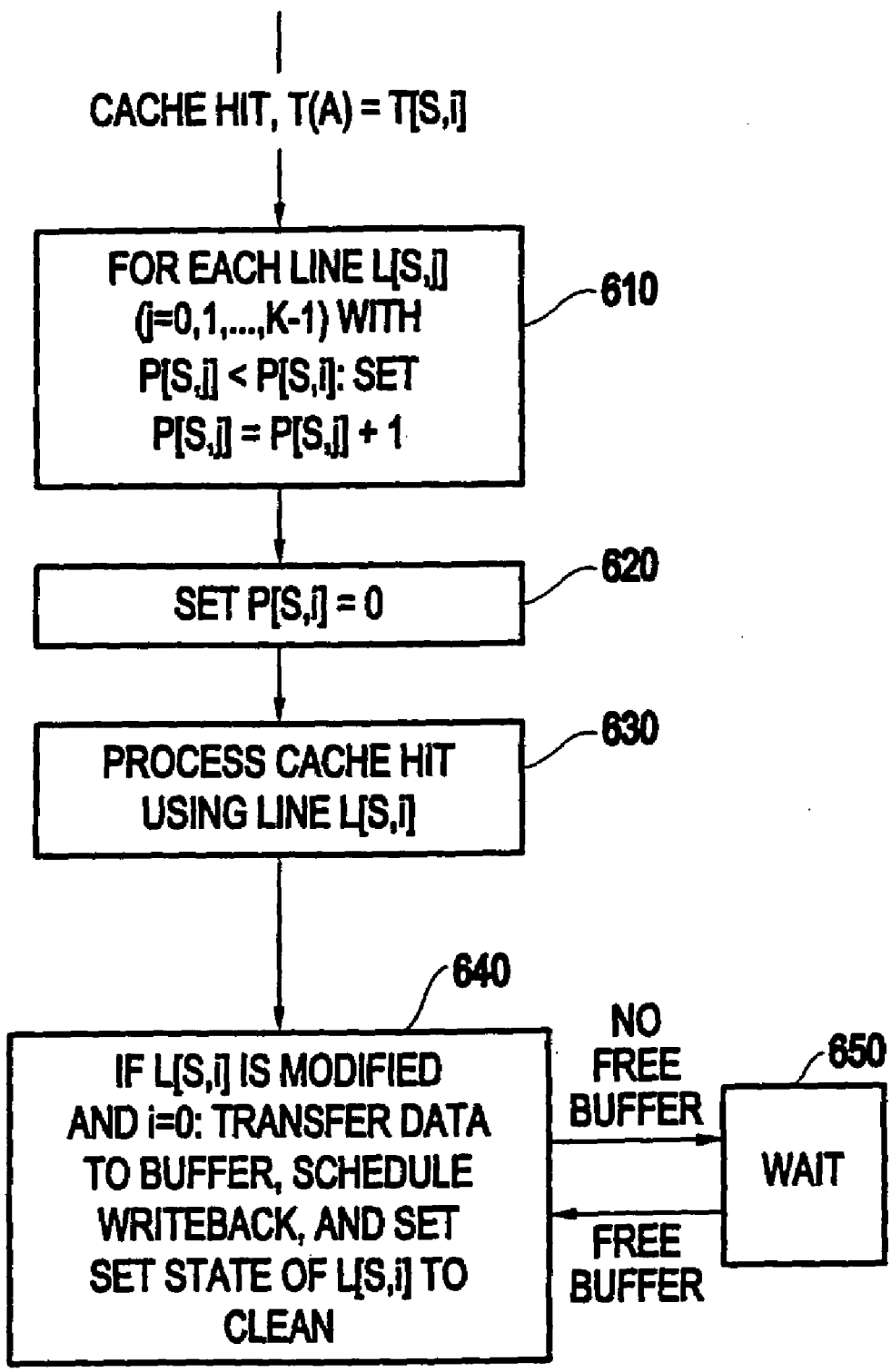
FIG. 6 is a schematic diagram showing a control Flow for K-Way Set Associative Cache in which the First Line of Each Set is Always Clean.

This is illustrated in FIG. 6 for the case of a cache hit on line L[S,i]. In logical steps 610 and 620, the LRU state of the lines in set S are changed so as to make L[S,i] the most recently referenced line, as previously described in steps 320 and 330 of FIG. 3. In step 630, the cache hit is processed, that is data is read from line L[S,i] for a read hit and written to L[S,i] for a write hit. Finally, unlike conventional systems, in step 640 it is checked if L[S,i] is in a modified state (which would be the case if the hit processed in step 630 were a write hit) and if i is equal to 0. If so, then the data of line L[S,i] is transferred to a writeback buffer (waiting in step 650 if no free buffer is available), and the line L[S,i] is marked as being in the clean (non-modified) state in the cache directory. As previously described, using the mechanism of FIG. 6, combined with the mechanism of FIG. 4 for a low free space condition in a compressed memory system, the result is that no writebacks of the initial cache contents are required during the OS processing required to handle the low free space condition.

It is straightforward to generalize this mechanism in various ways. For example, rather than always handling the first line L[S,0] in a store-through fashion, instead, in each set in the cache, each line L[S,i] that becomes the LRU line in that set as a result of a cache hit or cache miss could be written out if it was in a modified state. In this case it is known, for each set in the cache, that the LRU line in that set is clean, and each such line in each set could be used for constrained replacement in handling a compressed memory low free space condition in a manner similar to that previously described using the first lines L[S,0] in each set.

Although the above has been described using LRU replacement, with constraints placed on the first line L[S,0] for each set of a K-way set-associative cache, it should be clear that it is straightforward to generalize this for other cache replacement methods (as previously mentioned), or for sets of lines in each set (for example the first two lines L[S,0] and L[S,1] in each set S, as has been described above for the method illustrated by FIG. 4, and where similar generalizations are straightforward for the methods illustrated by FIGS. 5 and 6) rather than just a single line in each set.

With the invention in nonuniform memory access (NUMA) systems having a number of compressed memory systems, the amount of free space required to guarantee forward progress during operating system handling of low free space conditions is reduced, and potential chain reactions of low free space conditions are avoided, by means of cache configurations in which constraints are imposed on the cache lines that can be used to hold non-local data. Finally, by using cache configurations in which certain predetermined cache lines are always processed using store-through rather than store-in mechanisms, with the invention the amount of free space required for both of the previous cases can be further reduced.

While the invention has been described in terms of preferred embodiments, those skilled in the art will recognize that the invention can be practiced with modification within the spirit and scope of the appended claims.

What is claimed is:

1. A method for constraining cache line replacement for processing a cache miss in a computer system containing a K way set associative cache in a compressed memory system, said method comprising:
   selecting lines in said cache of said compressed memory system for replacement; and
   for a cache miss, constraining said selecting process in response to one of a sufficiently low free space memory condition and a no free space memory condition such that only a single specified cache line from each set of cache lines can be selected for replacement in order to ensure that any modified lines can be written back to said compressed memory system, when necessary, wherein said sufficiently low free space memory condition is a condition in which available free space memory is below a preset amount that is dependent upon a size of said cache.

2. The method in claim 1, wherein said constraining of said selecting process is selectively enabled.

3. The method in claim 2, wherein a selective enablement of said constraining of said selecting process is based on said free space memory condition of a memory associated with said cache.

4. A method for constraining cache line replacement in a computer system containing a K way set associative cache in a compressed memory system, said method comprising:

selecting lines in said cache of said compressed memory system for replacement; and for a cache miss, constraining said selecting process in response to one of a sufficiently low free space memory condition and a no free space memory condition in order to ensure that any modified lines can be written back to said compressed memory system, when necessary, wherein said constraining comprises:

specifying a predetermined subset of cache lines from each set of cache lines, wherein said predetermined subset comprises less than all of said cache lines in said set of cache lines and further comprises at least two specified cache lines; and only selecting one of said at least two specified cache lines from said predetermined subset for replacement, wherein said sufficiently low free space memory condition is a condition in which available free space memory is below a preset amount that is dependent upon a size of said cache.

5. The method of claim 4, wherein said one of said at least two specified cache lines is selected based upon which of said at least two specified cache lines was accessed least recently.

6. The method in claim 4, wherein said constraining of said selecting process is selectively enabled.

7. The method in claim 6, wherein a selective enablement of said constraining of said selecting process is based on said free space memory condition of a memory associated with said cache.

8. A method for constraining cache line replacement for processing a cache miss in a nonuniform compressed memory access computer system having a plurality of nodes, in which each of said nodes contains a K way set associative cache and a local memory, said method comprising:

selecting lines in said cache of said compressed memory access system for replacement; and for a cache miss, constraining said selecting process in response to one of a sufficiently low free space memory condition and a no free space memory condition such that only a single specified cache line from each set of cache lines can be selected for replacement of data from a local main memory of each local node and such that said single specified cache line can only contain data from said local main memory of each local node, wherein said constraining ensures that any modified lines can be written back to said compressed memory system, when necessary, wherein said nodes comprise compressed memory systems, and wherein said sufficiently low free space memory condition is a condition in which available free space memory is below a preset amount that is dependent upon a size of said cache.

9. The method in claim 8, wherein said constraining of said selecting process is selectively enabled.

10. The method in claim 9, wherein a selective enablement of said constraining of said selecting process is based on a free space memory condition of a local memory associated with said cache.

11. A method for constraining cache line replacement for processing a cache miss in a nonuniform compressed memory access computer system having a plurality of nodes, in which each of said nodes contains a K way set associative cache and a local memory, said method comprising selecting lines in said cache of said compressed memory access system for replacement; and for a cache miss, constraining said selecting process in response to one of a sufficiently low free space memory condition and a no free space memory condition in order to ensure that any modified lines can be written back to said compressed memory system, when necessary, wherein said constraining comprises:

specifying a predetermined subset of cache lines from each set of cache lines, wherein said predetermined subset comprises less than all of said cache lines in said set of cache lines and further comprises at least two specified cache lines; and only selecting one of said at least two specified cache lines from said predetermined subset for replacement; and wherein said constraining of said selecting process prohibits data from a non local node from replacing data in a cache line within said subset, such that said subset of lines can only contain data from a local main memory of each local node, wherein said constraining of said selecting process allows data from a local node to replace data in all lines in said subset, and wherein said nodes comprise compressed memory systems.

12. The method in claim 11, wherein said subset comprises a first subset and said set further comprises a second subset, and wherein said constraining of said selecting process constrains said selecting process such that said first subset is strictly limited to data residing in a memory of said local node.

13. The method in claim 11, wherein said one of said at least two specified cache lines is selected based upon which of said at least two specified cache lines was accessed least recently.

14. The method in claim 11, wherein said constraining of said selecting process is selectively enabled.

15. The method in claim 13, wherein a selective enablement of said constraining of said selecting process is based on a free space memory condition of a local memory associated with said cache.

16. A method for processing a cache write hit in a computer system containing a K way set associative cache in a compressed memory system having a memory, said method comprising:

selecting lines in said cache of said compressed memory system for replacement; and for a cache miss, constraining said selecting process in response to one of a sufficiently low free space memory condition and a no free space memory condition such that only a single specified cache line from each set of cache lines can be selected for replacement in order to ensure that any modified lines can be written back to said compressed memory system, when necessary;

modifying said single specified cache line;

writing data from said single specified cache line through to said memory immediately as said single specified cache line is modified and marking said single specified cache line as unmodified, such that said single specified cache line is always in an unmodified state; and modifying remaining cache lines of said set without writing to said memory.

17. The method in claim 16, wherein said writing of said data from said subset comprises writing said data to a writeback buffer.

18. A program storage device readable by machine, tangibly embodying a program of instructions executable by the machine to perform a method for constraining cache line replacement for processing a cache miss in a computer system containing a K way set associative cache in a compressed memory system, said method comprising:

selecting lines in said cache of said compressed memory system for replacement; and for a cache miss, constraining said selecting process in response to one of a sufficiently low free space memory condition and a no free space memory condition such that only a single specified cache line from each set of cache lines can be selected for replacement in order to ensure that any modified lines can be written back to said compressed memory system, when necessary.

19. The program storage device in claim 18, wherein said constraining of said selecting process is selectively enabled.

20. The program storage device in claim 18, wherein a selective enablement of said constraining of said selecting process is based on said free space memory condition of a memory associated with said cache.

21. A method for processing a cache write hit in a computer system containing a K way set associative cache in a compressed memory system having a memory, said method comprising:

selecting lines in said cache of said compressed memory system for replacement;

constraining said selecting process in response to one of a sufficiently low free space memory condition and a no free space memory condition in order to ensure that any modified lines can be written back to said compressed memory system, when necessary;

wherein said constraining comprises:

specifying a predetermined subset of cache lines from each set of cache lines, wherein said predetermined subset comprises less than all of said cache lines in said set of cache lines and further comprises at least two specified cache lines; and only selecting one of said at least two specified cache lines from said predetermined subset for replacement; and modifying said subset;

writing data from said subset through to said memory immediately as said subset is modified and marking said subset as unmodified, such that said subset is always in an unmodified state; and modifying remaining cache lines of said set without writing to said memory.

22. The method in claim 21, wherein said writing of said data from said subset comprises writing said data to a writeback buffer.

23. A program storage device readable by machine, tangibly embodying a program of instructions executable by the machine to perform a method for constraining cache line replacement for processing a cache miss in a computer system containing a K way set associative cache in a compressed memory system, said method comprising:

selecting lines in said cache of said compressed memory system for replacement; and for a cache miss, constraining said selecting process in response to one of a sufficiently low free space memory condition and a no free space memory condition in order to ensure that any modified lines can be written back to said compressed memory system, when necessary, wherein said constraining comprises:

specifying a predetermined subset of cache lines from each set of cache lines, wherein said predetermined subset comprises less than all of said cache lines in said set of cache lines and further comprises at least two specified cache lines; and only selecting one of said at least two specified cache lines from said predetermined subset for replacement.

24. The program storage device of claim 23, wherein said one of said at least two specified cache lines is selected based upon which of said at least two specified cache lines was accessed least recently.

\* \* \* \* \*